INVENTORS.
WILLIAM E. CORY
LOUIS E. CATLETT

Aug. 4, 1959  W. E. CORY ET AL  2,898,402
MONITOR FOR A TELETYPEWRITER
Filed Dec. 6, 1957  14 Sheets-Sheet 6

INVENTORS.
WILLIAM E. CORY
LOUIS E. CATLETT
BY Wade Keenty
  ATTORNEY
Richard J Killoren
  AGENT

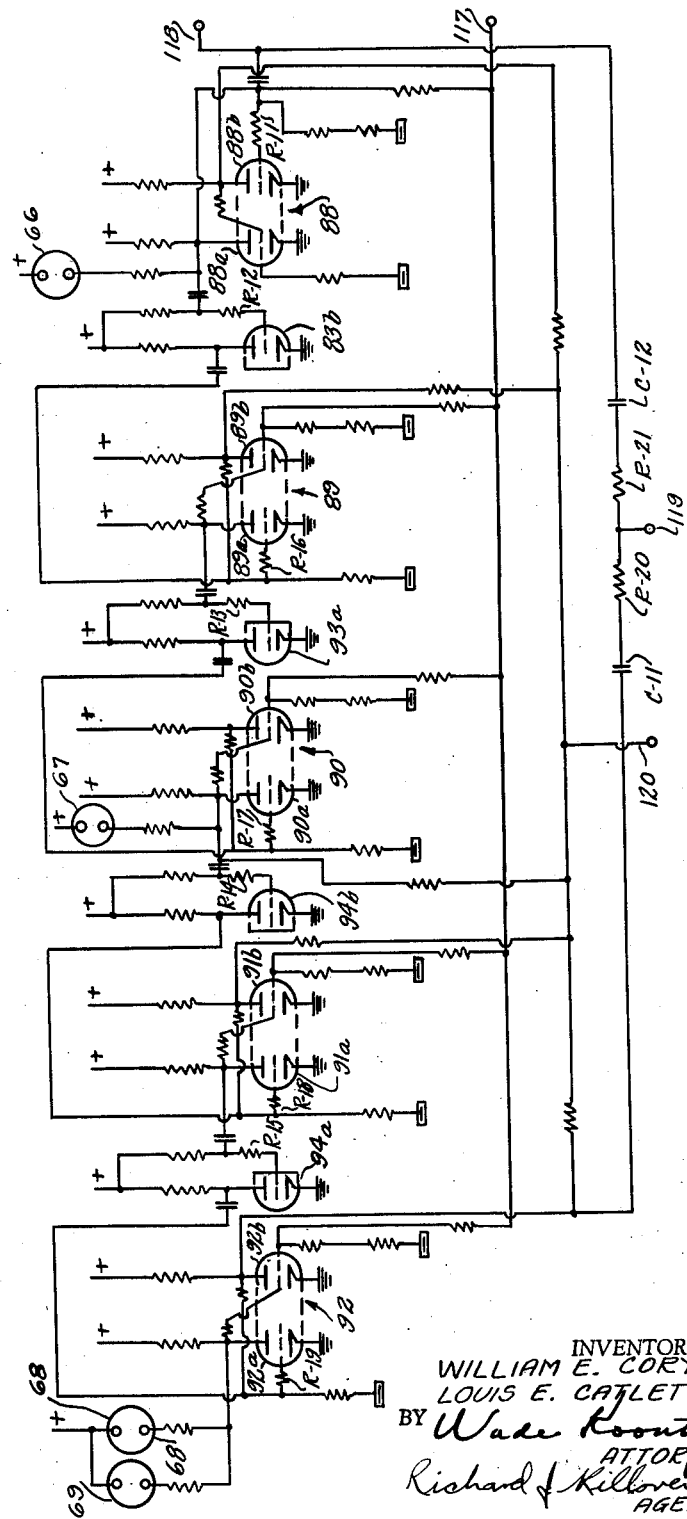

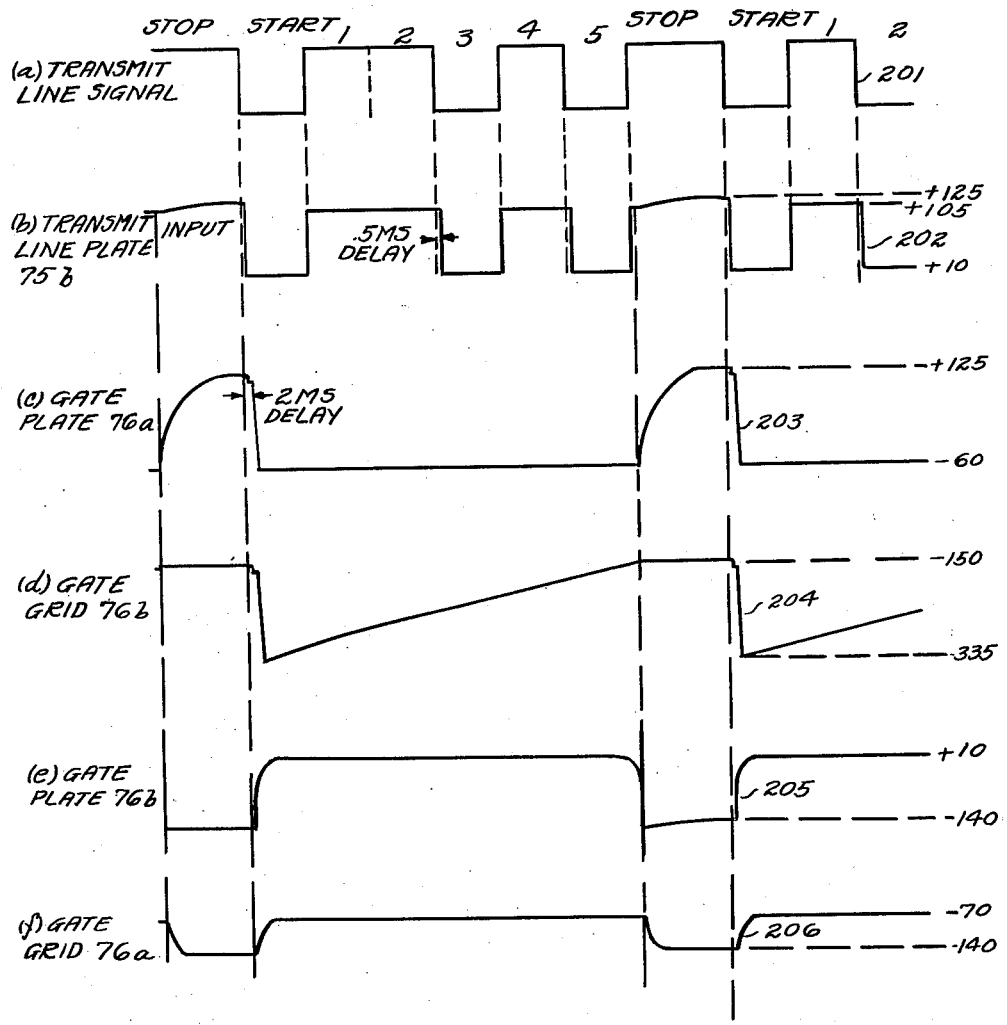

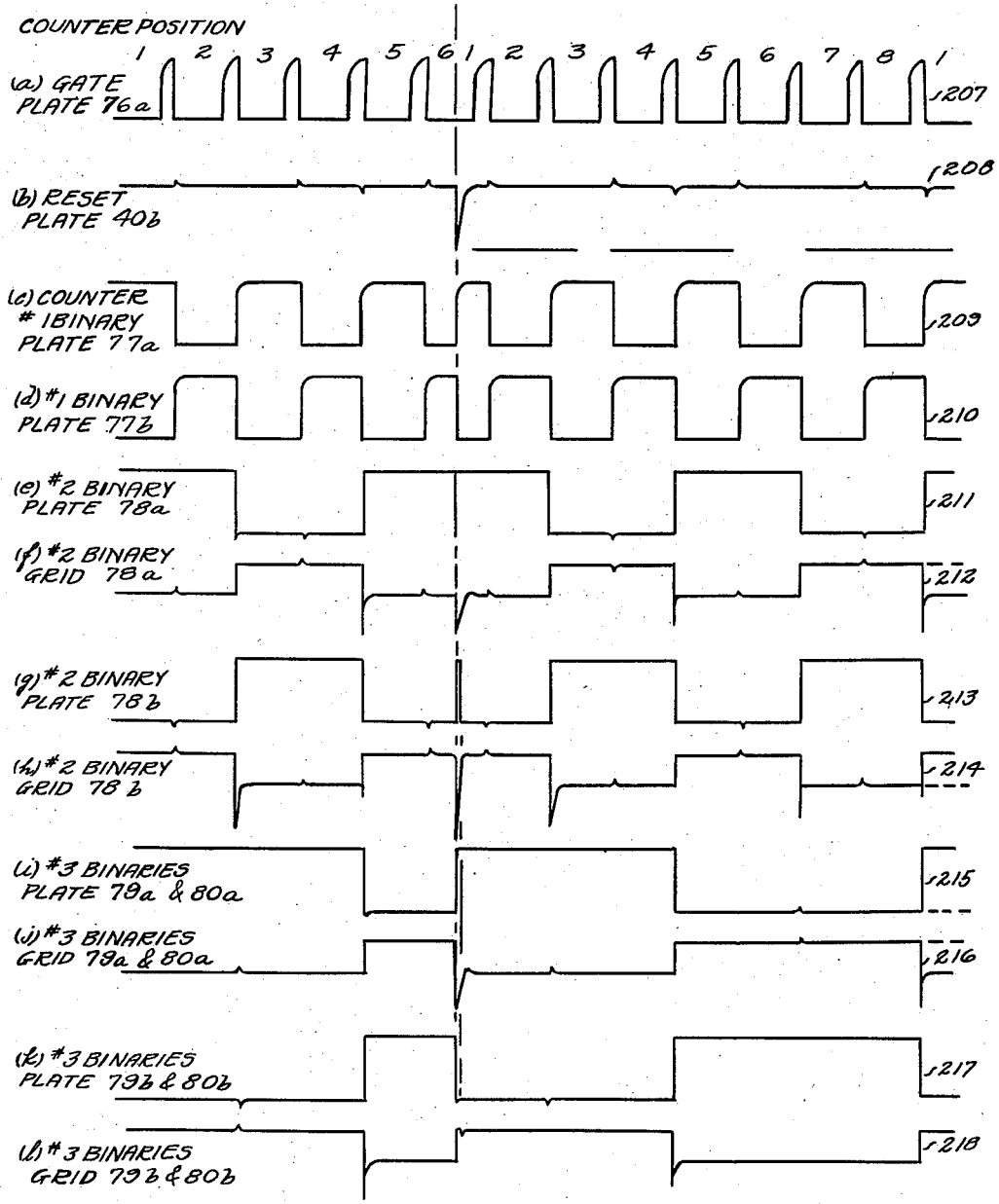

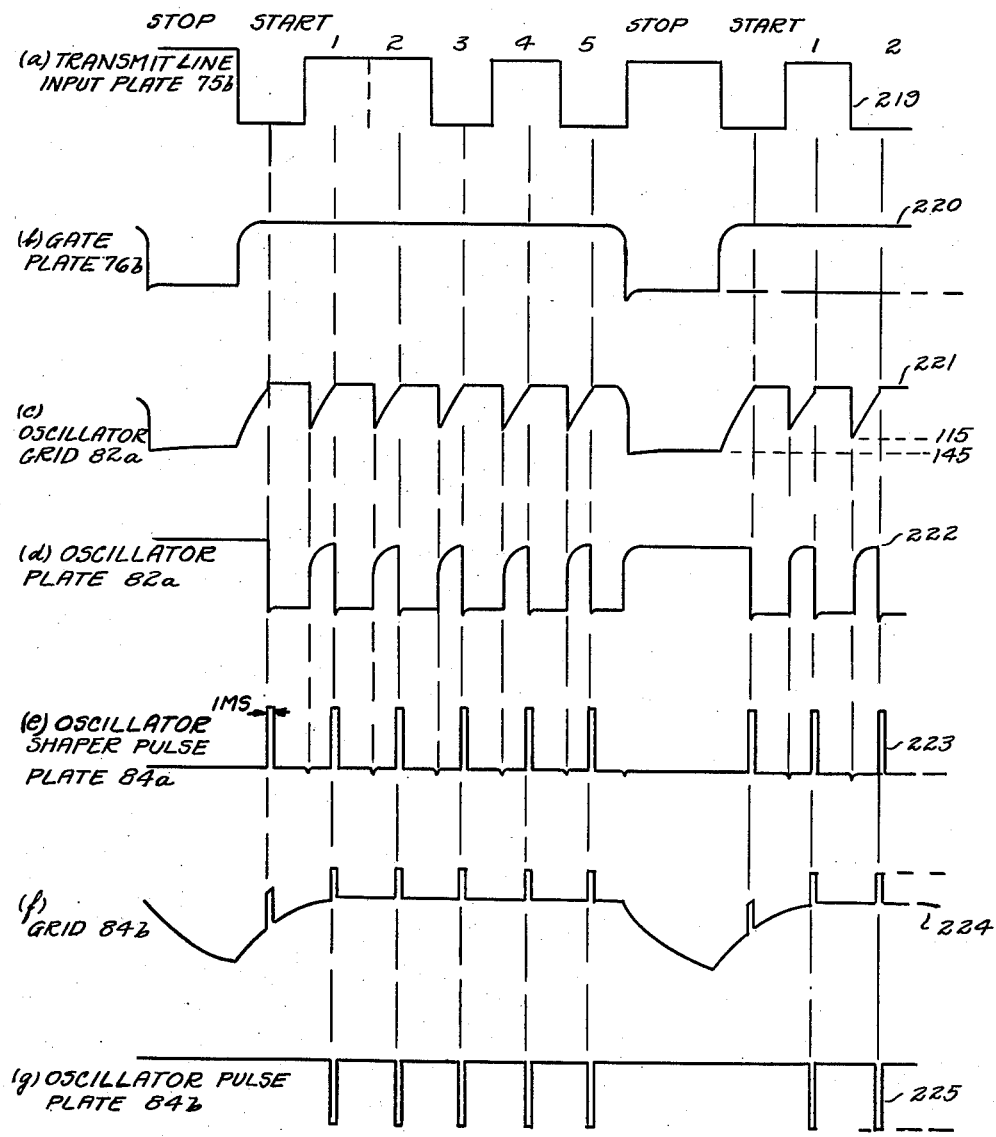

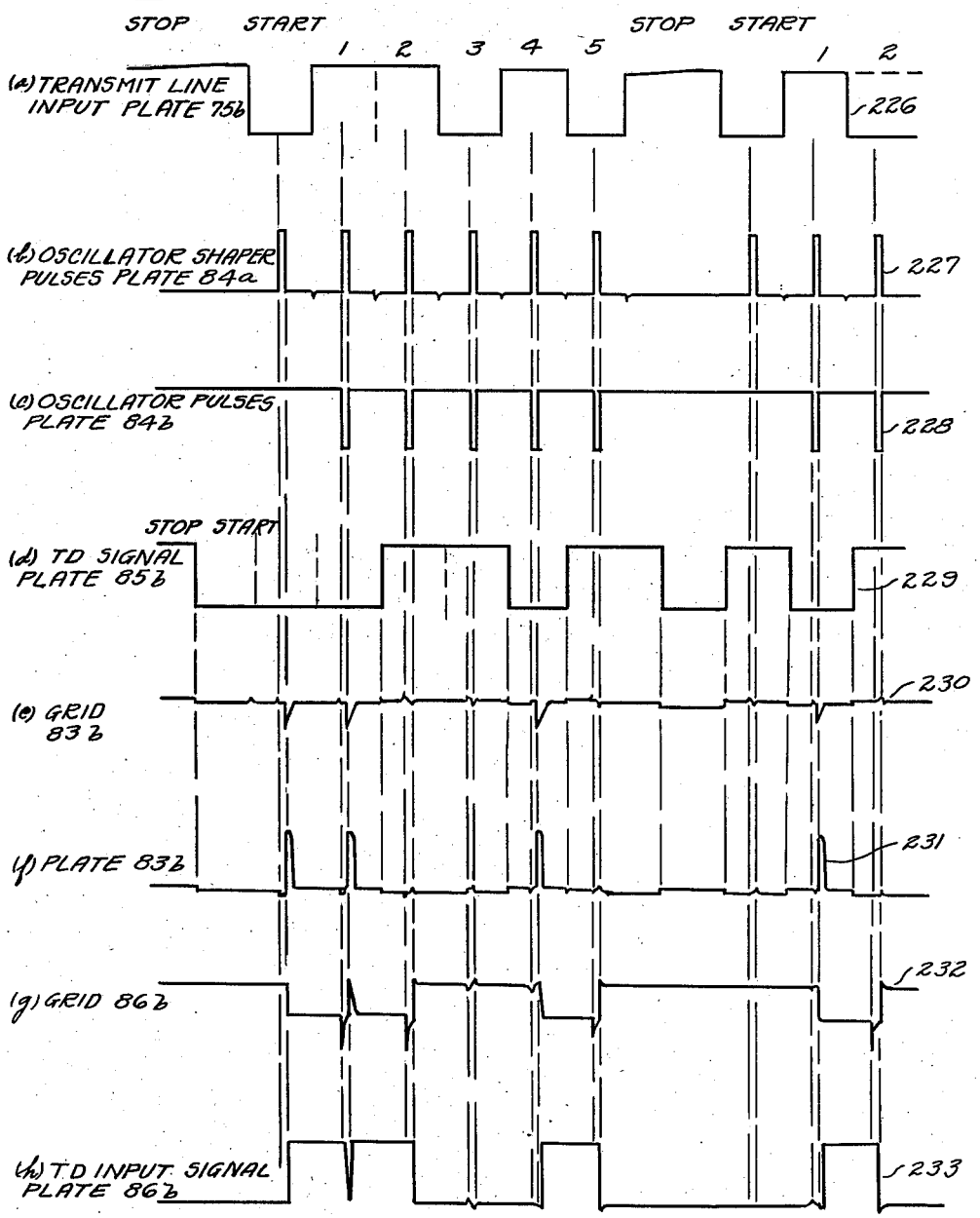

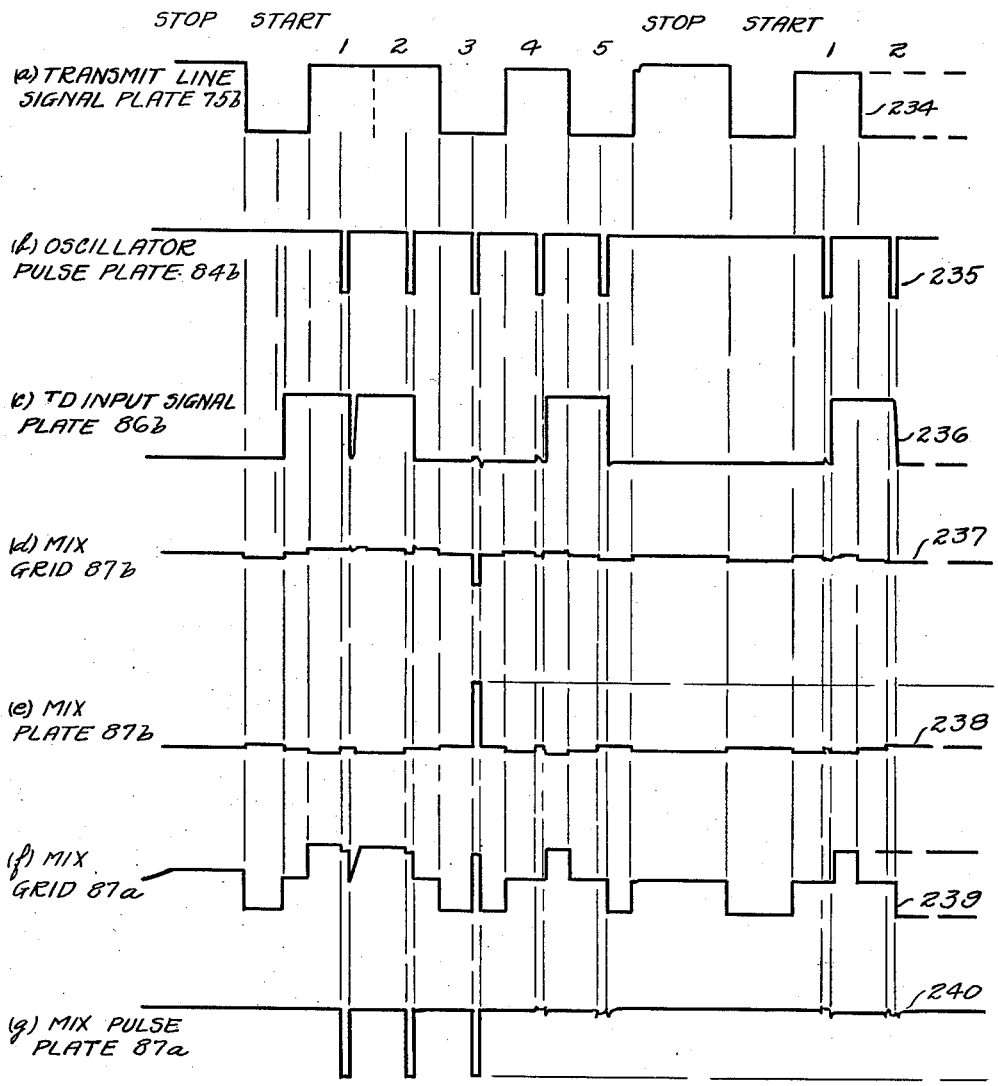

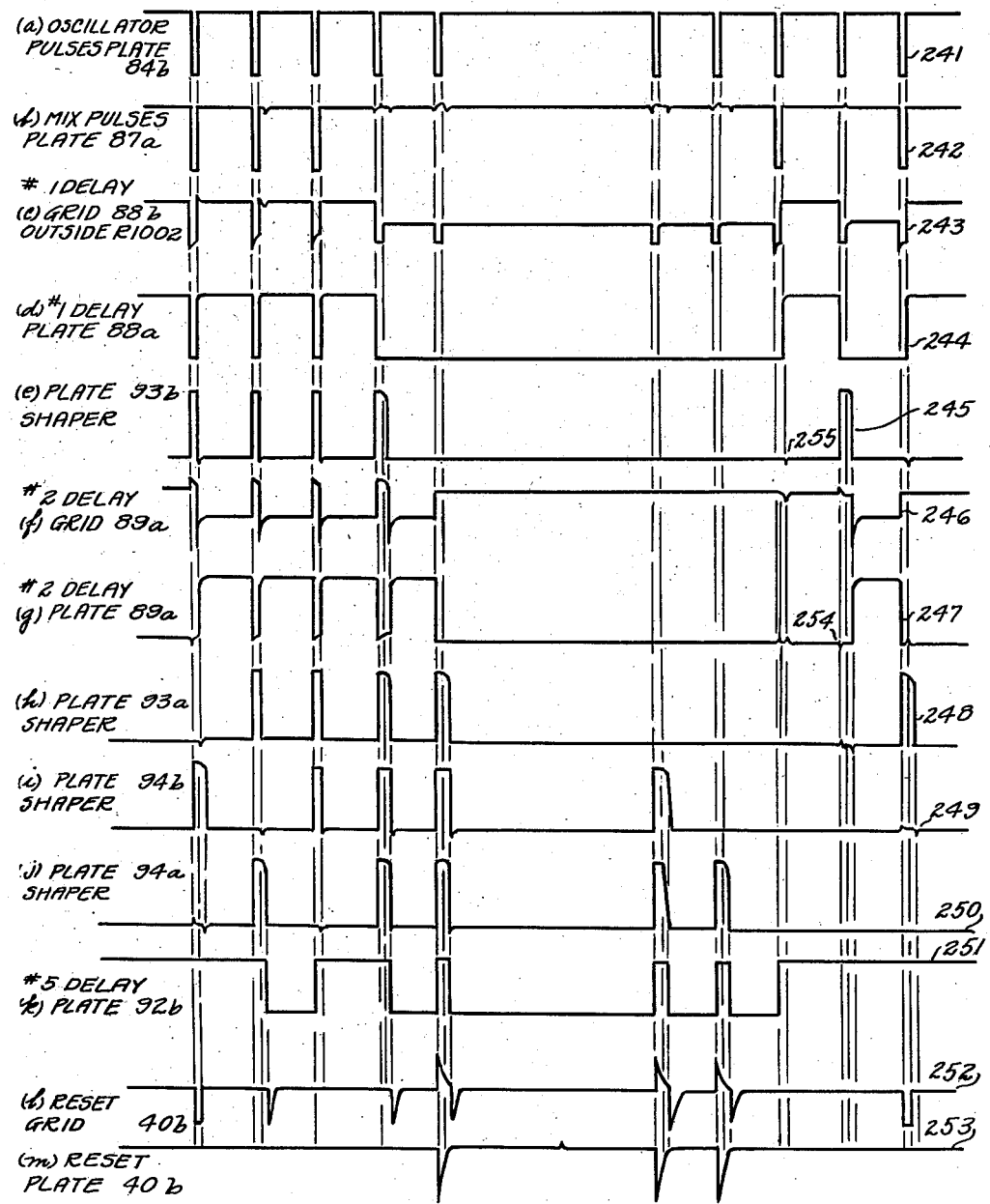

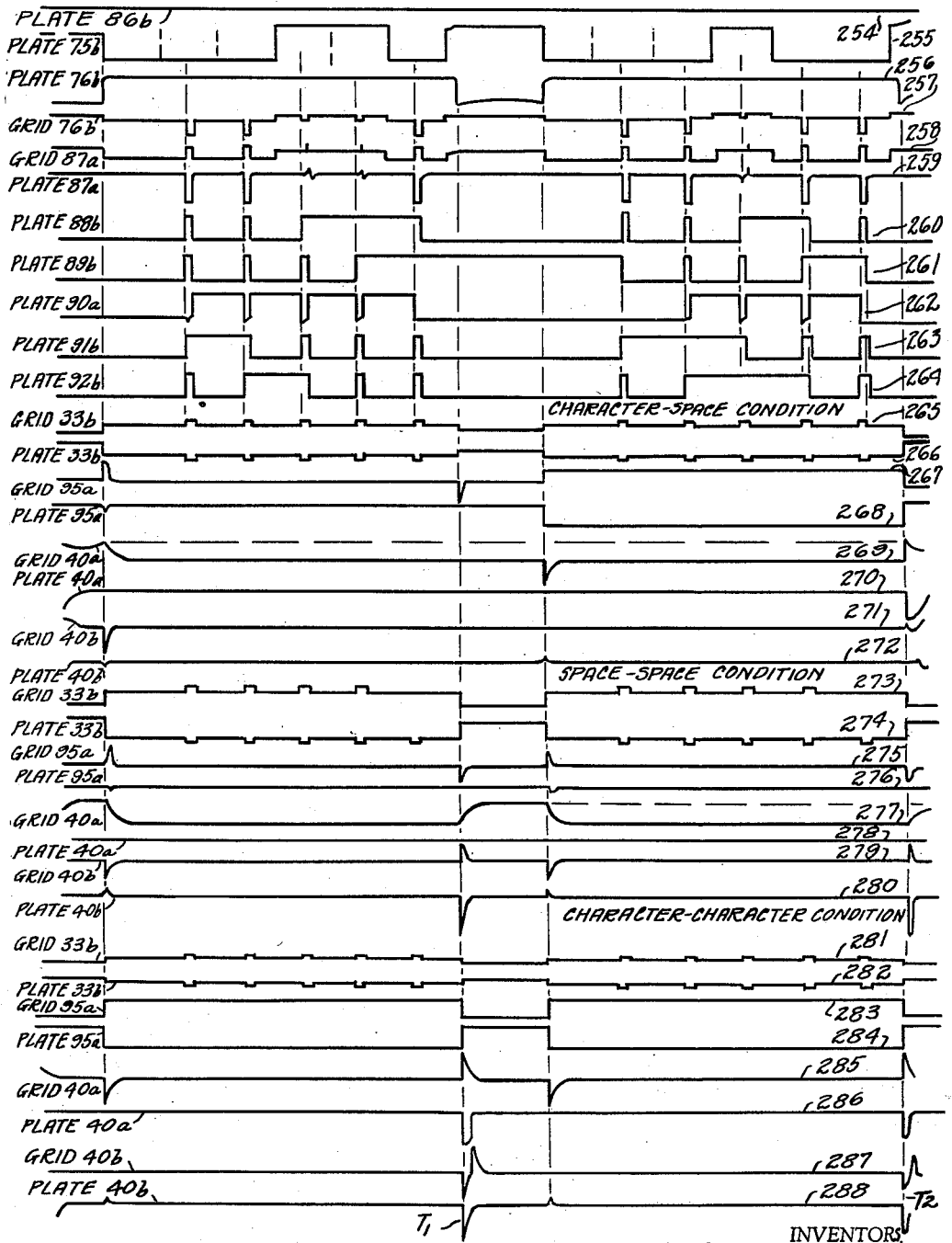

2,898,402
Patented Aug. 4, 1959

2,898,402

MONITOR FOR A TELETYPEWRITER

William E. Cory, Sherman Oaks, Calif., and
Louis E. Catlett, Albuquerque, N. Mex.

Application December 6, 1957, Serial No. 701,278

16 Claims. (Cl. 178—22)

(Granted under Title 35, U.S. Code (1952), sec. 266)

The invention described herein may be manufactured and used by or for the United States Government for governmental purposes without payment to us of any royalty thereon.

This invention relates to an electronic monitor for a teletypewriter to prevent inadvertent clear text transmission of classified messages and to check for no key or mono-alphabetic key on the output line during cipher operation.

One object is to provide a device for monitoring a teletypewriter during cipher operation and for indicating when there is no key change for seven consecutive characters so that transmission may be stopped.

Another object is to provide a device that will check the character space sequence during text operation of the teletypewriter and indicate when four consecutive character space sequences have been transmitted so that further transmission may be stopped.

These and other objects will best be understood from the following description when read in conjunction with the accompanying drawing, in which:

Fig. 10 is a circuit schematic showing the five baud delay circuit together with the shaper circuits of the device of Fig. 2.

Figs. 12–18 illustrate waveforms appearing at various points in the circuit of Fig. 2.

The device of this invention is for the purpose of preventing the inadvertent sending of a classified message over a Teletype circuit in clear text. An eighth position counter is used to count the characters transmitted. An alarm is sounded and transmission is stopped if the counter reaches its eighth counting position. In text operation of the teletypewriter the monitor acts to reset the counter to zero when a space-space sequence or a character-character sequence is transmitted. The alarm therefore sounds if four consecutive character-space sequences are transmitted. For example if the message to be transmitted is secret, the message will be stopped after SECR has been transmitted in the heading of the message. When the teletypewriter is in the cipher operating position the monitor acts to reset the counter to zero each time there is a change in the cipher key signal so that if there is no change for seven consecutive characters the alarm is sounded and transmission of the message is stopped.

Figure 1:
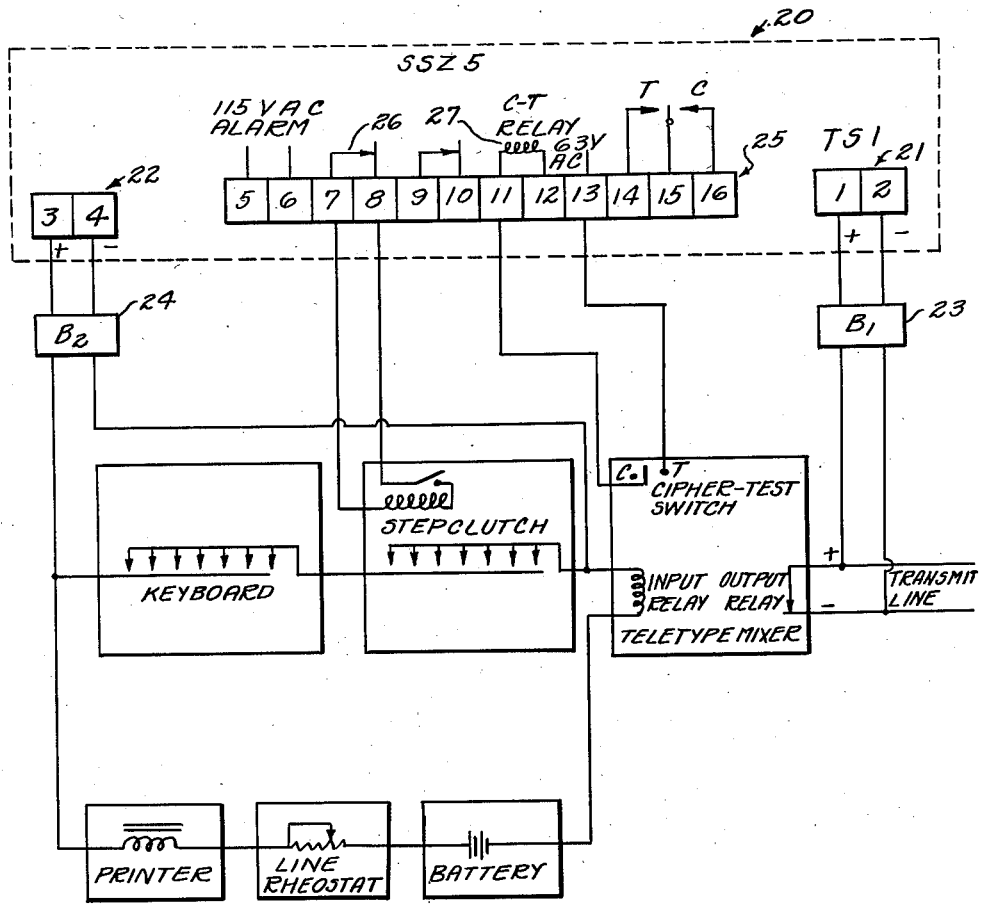
Fig. 1 is a block diagram showing the manner in which the monitor unit is connected to the teletypewriter.

Referring more particularly to Fig. 1, reference numeral 20 refers to the input panel for the monitor unit. Reference numerals 21 and 22 refer to the transmit line input terminals and the transmitter distributer input terminals, respectively. Reference numerals 23 and 24 refer to high frequency filters which keep spurious noise pulses from entering or leaving the monitor unit. Reference numeral 25 refers to a terminal panel which has terminals 7 and 8 connected to relay contacts 26 in the monitor alarm circuit and to the step clutch circuit of the transmission distributer circuit of the teletypewriter to stop operation of the teletypewriter when the alarm sounds. Terminals 11 and 13 are connected to the cipher text switch in the teletypewriter and to a relay 27 in the monitor unit to switch the monitor between text and cipher operation as the teletypewriter is switched.

Figure 2:
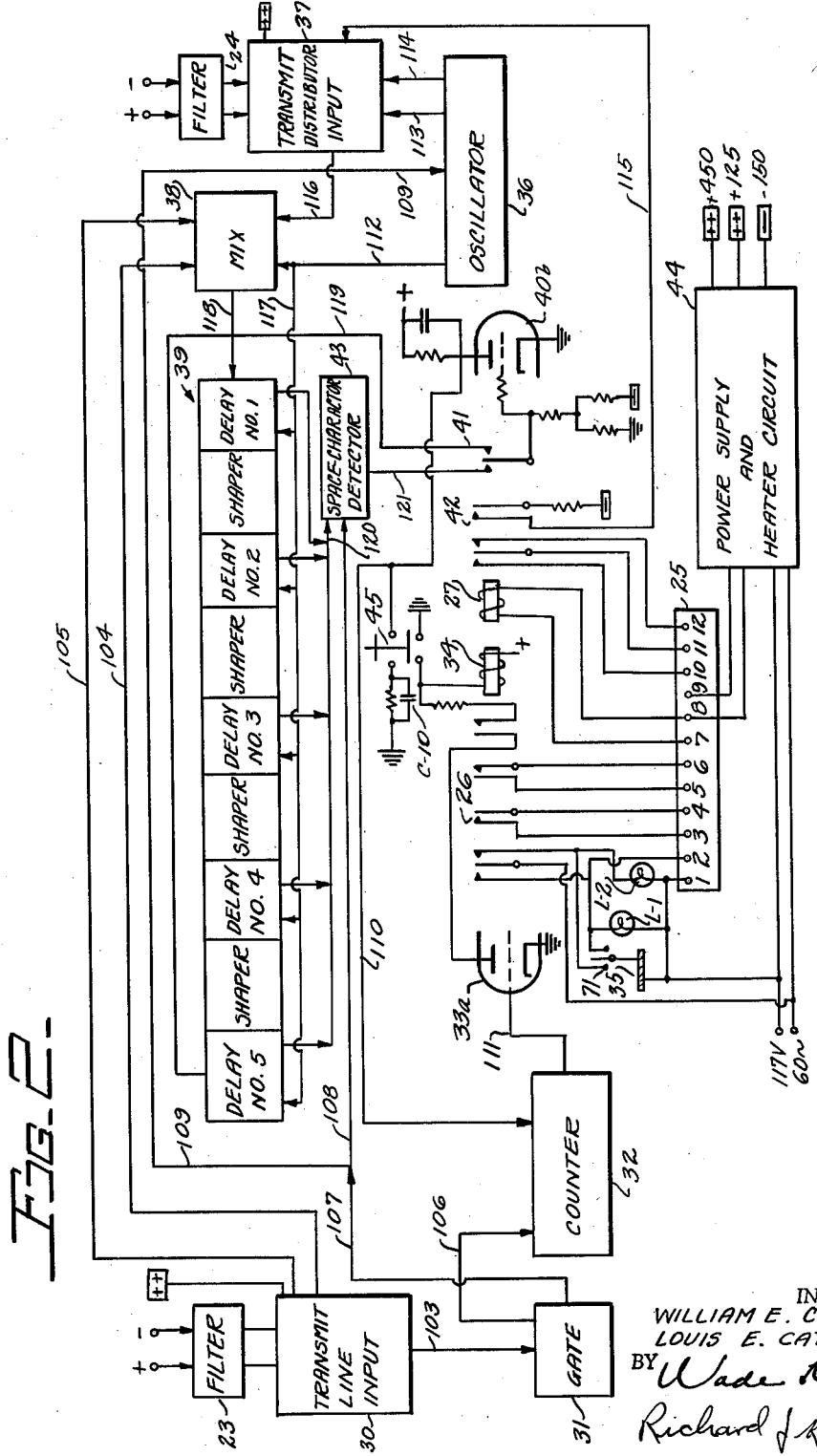
Fig. 2 is a circuit schematic partially in block form of the monitor unit of the invention.

Referring now to Fig. 2 reference numeral 30 refers to a transmit line input circuit to which the transmit line signal is applied after it is fed through filter 23. The output of circuit 30 is fed to a gate circuit 31, which operates upon each mark-to-space transition, representing the change from a stop to a start baud on the transmit line. The gate stays in its triggered position for approximately 135 milliseconds, after which it returns to its normal position until the next mark-to-space transition at the beginning of the next character. An eight place counter circuit 32 is connected to said gate circuit to continuously count gate operations. When the counter reaches its eighth counting position it cuts off tube 33a, which in turn causes relay 34 to fall out and remain out and thereby light the light L–1, operates an alarm 35 and also stops transmission in the manner described in connection with Fig. 1. The transmission distributer is stopped at the key at which the alarm sounds, however, keyboard operation is not affected under alarm conditions. The audible alarm can be switched off by switch 71. If this switch is thrown when the alarm is not operated, the audible alarm will sound thus preventing it from being left in the alarm off position. The light L–2 is on during normal operation and goes off during an alarm condition.

When the trouble is cleared, reset button 45 is pressed. This operates relay 34 which closes contacts to tube 33a, thereby providing holding current to relay 34, releases the transmitter distributor, resets the counter and sounds the alarm until the alarm off switch is returned to its normal position.

The output of gate circuit 31 is also applied to an oscillator 36. Oscillator 36 is then released for operation for the total time that the gate is in its triggered position. The oscillator produces five pulses during this time which are timed to occur 11 milliseconds after the beginning of each of the five character bauds of an unbiased Teletype line signal. This allows sampling of the transmit line Teletype character during each of its character bauds even with extreme bias present. A transmit distributer input circuits 37 receives the transmit distributer signal from filter 24 and delays the signal for the time necessary to properly align it with the transmit line signal for comparison. The transmit line signal and the transmit distributor signal are compared in mix circuit 38 during the time of the oscillator pulses, to recover the cipher key signal.

A five baud delay circuit 39 delays each baud for a time which is sufficient for it to be compared with the corresponding baud of the next cipher key signal character. The output of the fifth delay stage of the five baud delay circuit is compared with the output of the mix circuit and is used to reset a counter reset tube 40b. A pulse out of the five baud delay circuit operates the counter reset circuit unless there is a pulse in the output of the mix circuit 38 at the same time where a pulse indicates a space baud in cipher key. The reset circuit 40b therefore operates to reset the counter 32 each time the cipher key signal changes. The alarm therefore sounds and transmission is stopped if there is no space baud to mark baud change in the cipher key signal for seven consecutive characters.

When the cipher-text switch in the Teletype mixer circuit of the teletypewriter is switched to text operation, relay 27 is actuated thereby switching relay contacts 41 so that space-character detector circuit 43 is connected to counter reset tube 40b and the transmit distributor input circuit 37 is locked in the mark position by relay contacts 42. The signal then applied to the five baud delay circuit represents the transmit line signal. The space-character detector circuit then compares the Teletype character stored in the five baud delay circuit with a signal received from the previous character stored therein and will operate the counter reset tube 40b when a character-character sequence or a space-space sequence occurs but will not operate reset tube 40b when a character-space sequence occurs. The reference numeral 44 refers to the heater circuit for the tubes of the monitor unit and the power supply circuit which are shown in greater detail in Fig. 3.

Figure 3:
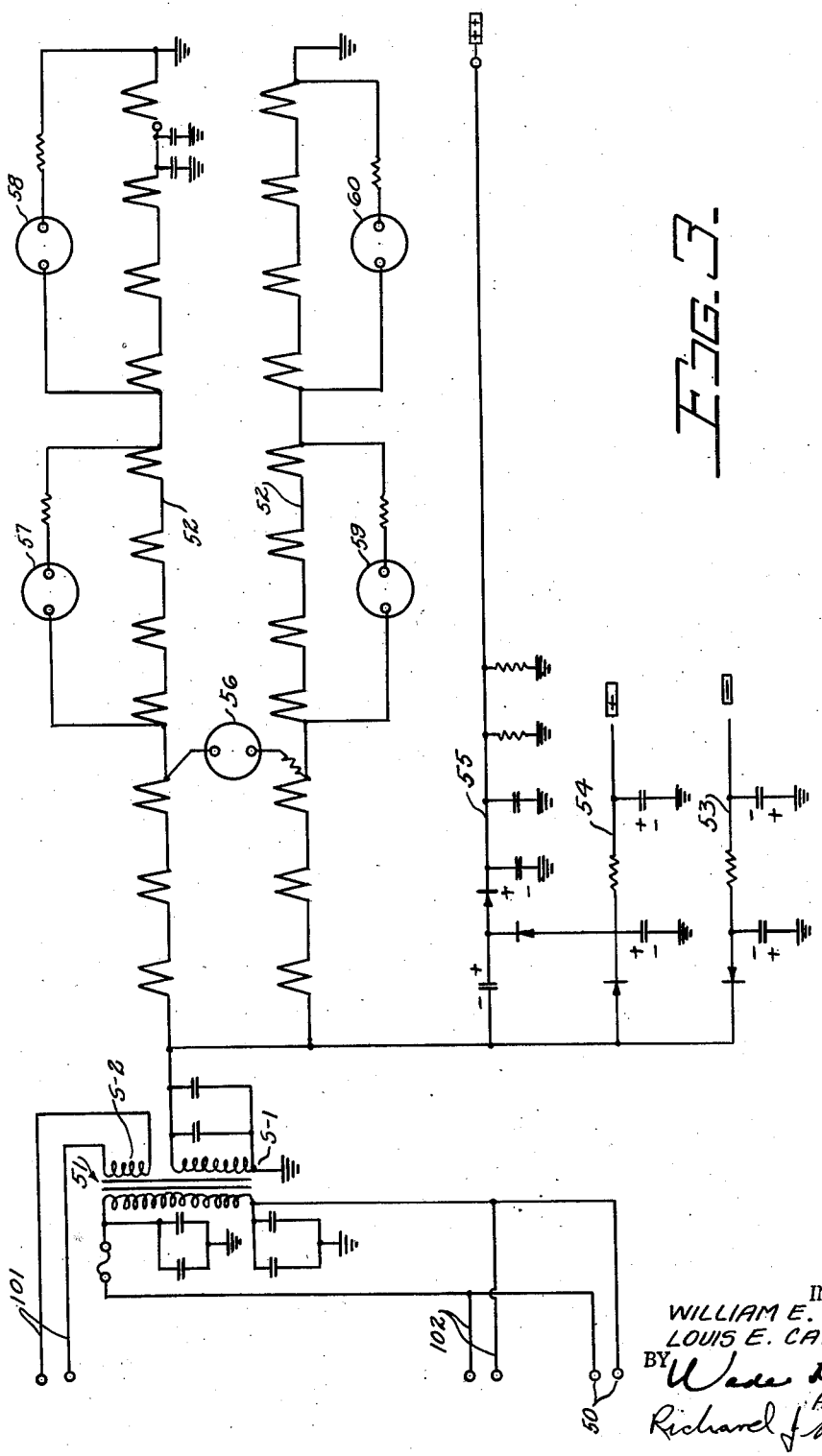
Fig. 3 is a circuit schematic showing the power supply and heater circuit of Fig. 2.
Figure 4:
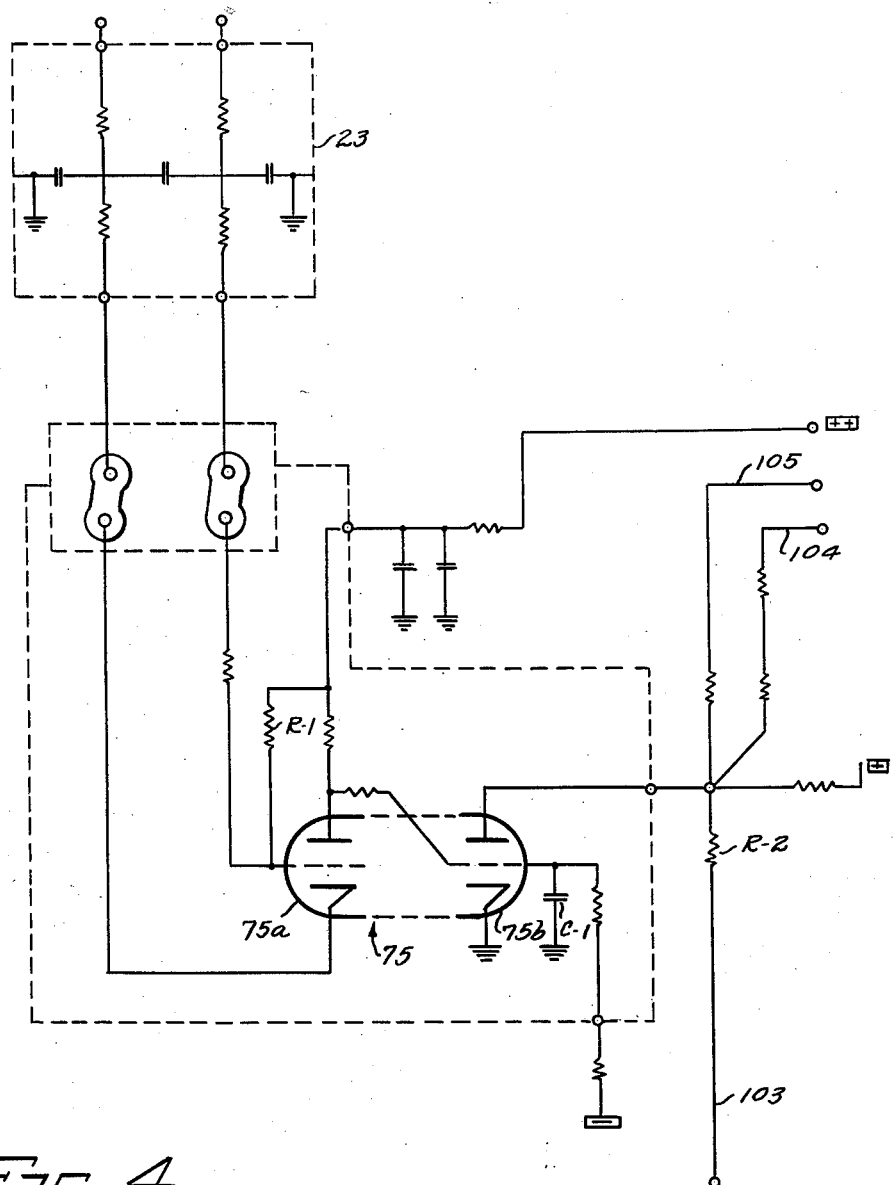
Fig. 4 is a circuit schematic showing the transmit line input circuit of Fig. 2.

The monitor unit operates from a normal 115 volt, 60 cycle power supply which is connected to input 50 which leads to the primary of the transformer 51, as shown in Fig. 3. Filament circuits 52 and unregulated voltage sources 53, 54 and 55 are connected to the secondary S–1 of the transformer. Series filaments are utilized in the monitor unit to insure alarm operation when any tube has an open filament. Neon lamps 56 through 60 are provided as an easy check for open filaments. Voltage sources 53 and 54 are simple half-wave condenser input power supplies and are normally minus 150 volts D.C. and plus 125 volts D.C., respectively. A voltage tripler 55 is supplied off of the B-plus to obtain 450 volts for operation of the first stage of both the transmit line input circuit and the transmitter distributer input circuit. Secondary S–2 of transformer 51 supplies power to operate relay 27 over leads 101. The alarm circuit is operated off the leads 102.

For the detailed description of the invention, reference is now made to Figs. 4 through 11. The transmit line input circuit of Fig. 4 regenerates the Teletype transmit line signal for use in the monitor unit. Waveforms 201 and 202 of Fig. 12 show the waveforms in the transmit line input circuit. Tube 75a has its grid connected to the minus side of the transmit line relay and its cathode connected to the plus side. When the relay is open, the grid is negative with respect to the cathode and tube 75a is cut off. The plate of tube 75a is connected to the 450 volt source 55 to insure that it will always be positive with respect to the grid and cathode irregardless of the grounding arrangement on the Teletype transmit line making the only requirement then that the same ground is common to both the teletypewriter and the monitor unit. The grid of tube 75a is biased slightly positive by resistor R–1 to the high voltage source 55. This is to insure that 75a is turned on in the presence of a slight voltage across the transmit relay line contacts such as could exist in the case of dirty relay contacts. This also decreases the effect of cathode degeneration of the signal due to filter 23.

Tube 75b is a shaper used to regenerate a signal off the plate of 75a. The plate of tube 75b is high when a mark is present on the transmit line and low when a space is present, as shown in waveform 202 of Fig. 12. Condenser C–1 prevents the passing of minute positive pulses from the plate of 75a into the remainder of the circuitry which may occur due to relay bounce. This condenser adds approximately .5 millisecond delay to mark-to-space transitions occurring on the transmit line as shown in waveform 202.

Figure 5:
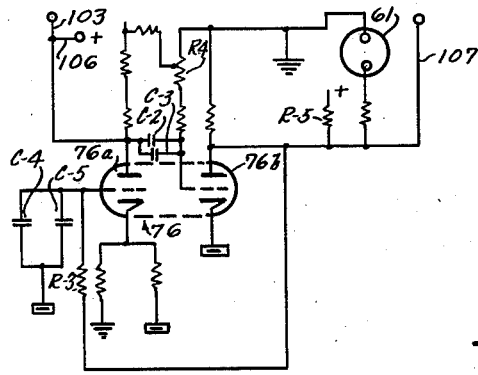
Fig. 5 is a circuit schematic of the gate circuit used in the device of Fig. 2.

The gate circuit of Fig. 5 is a one-shot multivibrator with an operation time of 135 milliseconds. In its normal relaxed condition, 76a is cut off and 76b is on. When a mark-to-space transition occurs on the transmit line and the gate is in its relaxed condition, the plate voltage of 76a is decreased by approximately 20 volts through the resistor R–2 from the plate of 75b of Fig. 4 as shown in waveforms 202 and 203 of Fig. 12. This 20 volt drop is passed through C2 and C3 to the grid of 76b as shown in waveform 204 of Fig. 12, thus cutting off tube 76b as shown in waveform 205 of Fig. 12. The plate of 76b then goes positive and begins charging condensers C–4 and C–5, which are connected to the grid of tube 76a, toward ground through resistance R–3 as shown in waveform 206, Fig. 12. This integrating circuit delays the gate operation by 1.5 milliseconds to more than adequately insure that relay bounce on the fifth character baud-to-stop-baud transition does not produce gate operation. When this voltage reaches the cut off voltage of 76a this tube is turned on. The process becomes regenerative and the gate is operated. The grid of 76b is driven to a large negative voltage through C–2 and C–3 and immediately begins charging back up to a voltage between ground and B-plus as determined by the setting of R–4. At 135 milliseconds the grid of tube 76b reaches B-minus voltage and tube 76b is turned on. The gate then relaxes or goes to its stable position. R–4 varies the length of the gate by varying the voltage that the grid of tube 76b is charging toward and the resistance through which it is charging. Resistance R–5 is tied to the plate of 76b to insure that the plate goes slightly positive when the tube is cut off to prevent the gate from upsetting the oscillator through 76a.

A neon tube 61 is provided to check the operation of tubes 75 and 76. It should be on before and after a character is transmitted and go off during the operation of the gate.

Figure 6:
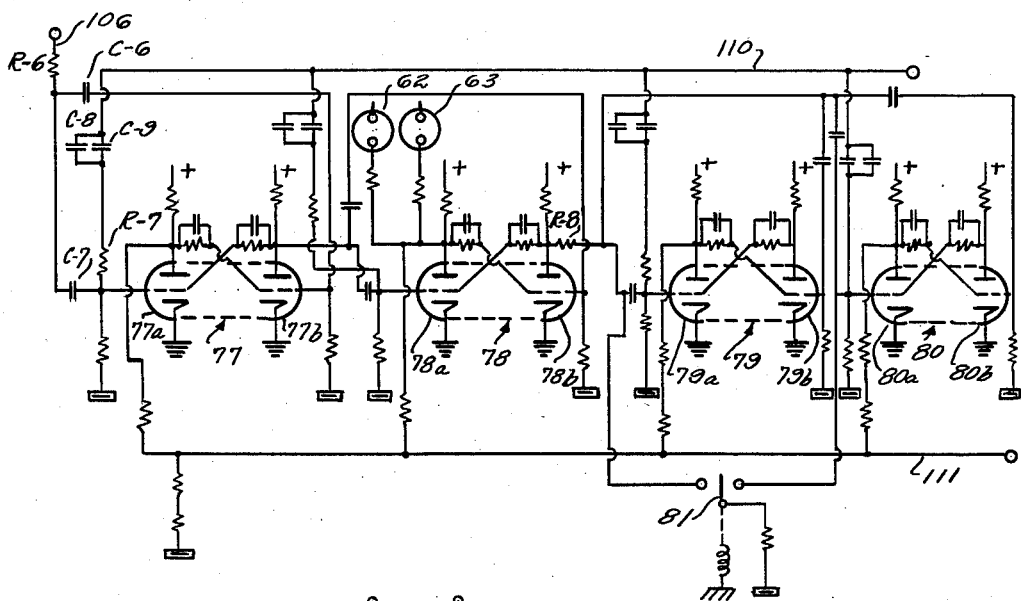
Fig. 6 is a circuit schematic showing a counter circuit which may be used with the device of Fig. 2.

The counter circuit of Fig. 6 is a three stage binary counter that continuously counts gate operations. Fig. 13 shows the waveforms appearing at the various points, as indicated, in the counting circuit. Neon tubes 62 and 63 provide means for checking the overall operation of the monitor unit. They come on each time the counter is allowed to count to its third counting position, which should occur on an average of once in every five characters in cipher operation and upon each space-character sequence in text operation. As the counter counts to its fifth position only infrequently, the third counter unit cannot be checked by neon tubes. To prevent the failure of its operation from preventing the sounding of the alarm, parallel operation of two counters 79 and 80 is used. Failure of either of these does not prevent normal alarm operation. A counter check switch 81 is used to render each of these counters inoperative, so that a periodic check of them can be made.

The first binary counter 77 counts the downgoing edges off of the plate of 76a as shown in waveforms 207 and 209 of Fig. 13. Due to the sloped condition of the downgoing edge of the signal on the plate of 76a, as shown in waveform 203 of Fig. 12, condensers C–6 and C–7 must be larger than the similar input condensers to the other counters. A resistor R–6 is provided in series with these condensers to prevent double counting of the downgoing edge due to the time it is present and also to prevent counter reflection into the gate circuit.

Reset of the first binary counter is accomplished by coupling the downgoing reset pulse, shown in waveform 208 of Fig. 13, from the plate of reset tube 40b, as shown in Fig. 2 to the grid of tube 77a through condensers C-8 and C-9 and through resistor R-7. This pulse is only slightly differentiated because of its short length, and therefore does not retrigger the counter on its upgoing edge. This resets the plate of 77a high as shown in waveform 209.

The second binary counter 78 counts the downgoing edges off of the plate of tube 77b as shown in waveforms 210 through 214. Reset is accomplished in the same manner as described in connection with counter 77. There is momentary counting of the reset transition from counter 77 if the first counter is reset from its second position, as shown in waveforms 209 through 214. This count is blocked however by the presence of the reset pulse on the grid of 78a, as shown in waveforms 212 and 213.

The third binary counters 79 and 80 count the downgoing edges off of the plate of tube 78b as shown in waveforms 213 and 215 through 218. A resistor R-8 is placed between the plate of tube 78b and the grids of counters 79 and 80 to prevent differentiation of the upgoing spike that appears on the plate of 78b at the moment of reset under the conditions as shown in the waveforms of Fig. 13. If the spike were differentiated, the downgoing edge of the upgoing spike shown in waveform 213 would trigger the third counter which would cause the plates of 79a and 80a to be reset low. Manual reset of the counter is accomplished after an alarm by switching a discharge condenser C-10 to the plate of reset tube 40b by means of a switch 45. This produces a reset pulse on the plate of the reset tube which will operate to reset the counter in the same manner as described above.

An adder circuit is operated off of the plates of tubes 77a, 78a, 79a and 80a to the grid of alarm tube 33a. When the counter is in its eight position all of these plates are low and this cuts off alarm tube 33a. If either 79a or 80a is low while 77a and 78a are low the alarm will operate. However, if both 79a and 80a are low with only one of the tubes 77a or 78a low, the alarm will not operate.

Figure 7:
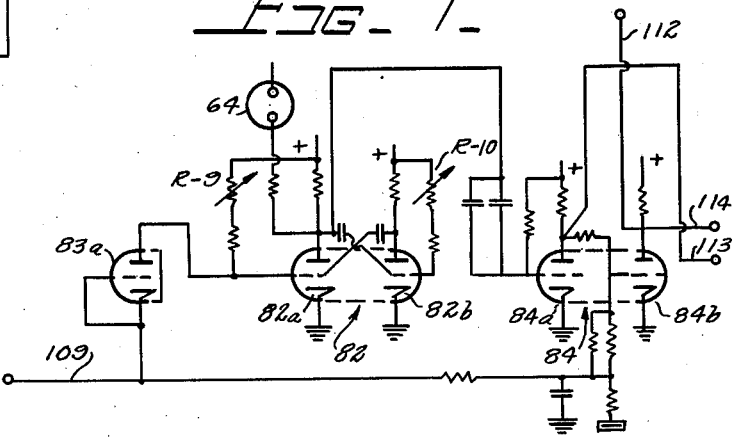
Fig. 7 shows the oscillator circuit of Fig. 2.
Figure 11:
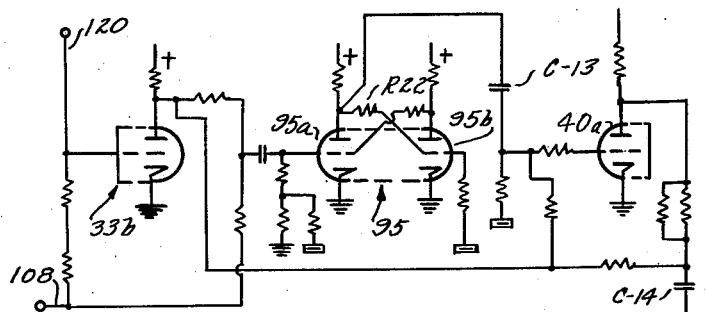
Fig. 11 is a circuit schematic showing the space character detector of Fig. 2.

The oscillator circuit of Fig. 7 is a free wheeling multivibrator, with a period of 22 milliseconds and a clamp and a shaper circuit. Fig. 14 shows the waveforms in the oscillator circuit. The oscillator 82 is clamped out during gate relaxed time by a diode clamp 83a to the plate of 76b that clamps the grid of 82a to −145 volts as shown in waveform 221. When the gate is operated by the stop baud to start baud transition, the clamp is released. The oscillator then oscillates six cycles during the gate operation time, and is then reclamped as shown in waveforms 219 through 222. A neon tube 64 is provided to check the oscillator and clamp for proper operation.

A shaper 84a is used to produce six 1 millisecond pulses off of the downgoing edges off of the plate of 82a as shown in waveforms 222 and 223. These six upgoing pulses shall henceforth be referred to as oscillator shaper pulses. A resistor R-9 is provided to align the first oscillator shaper pulse with the center of the start baud. A resistor R-10 is then used to align the remainder of the oscillator shaper pulses with the center of their respective bauds, by varying the on time of the plate of 82a. This has no effect on the position of the first oscillator shaper pulse.

The six oscillator shaper pulses are then added to an integrated gate waveform derived from the plate of tube 76b on the grid of 84b as shown in waveform 224. The integrated gate waveform biases the grid of 84b beyond cut off during the first oscillator shaper pulse. The plate to 84b then has five downgoing pulses that are timed to occur in the center of each of the five character bauds of the transmit line signal, as shown in waveforms 219 and 225. These pulses are used for sampling and mixing in the monitor and will henceforth be referred to as oscillator pulses.

Figure 8:
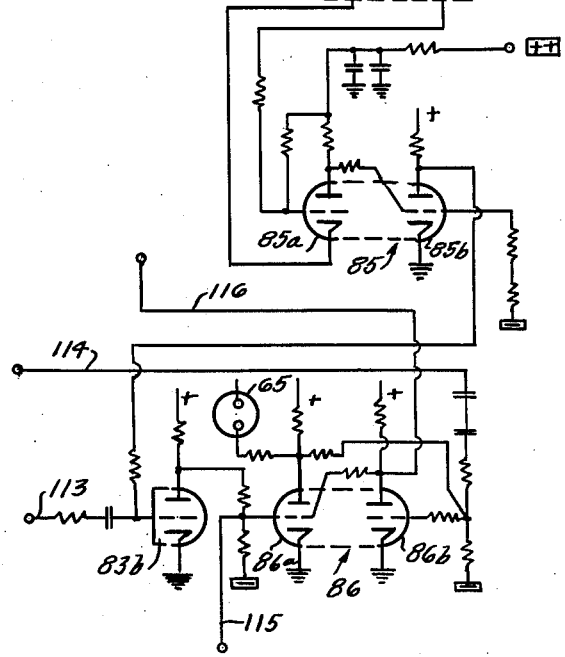
Fig. 8 is a circuit schematic showing the transmitter distributer input circuit of Fig. 2.

The transmitter distributer input circuit of Fig. 8 regenerates and delays the transmitter distributer signal for use in the monitor unit. Fig. 15 shows the waveforms of the transmitter distributer input circuit. Function of tubes 85a and 85b is identical to that of tubes 75a and 75b in the transmitter line input circuit. However, no delay is made on space-to-mark transition as in the transmit line input circuit so no condenser such as C-1 is placed on the grid of 85b. Time delay exists between the transmitter distributer character and the transmit line character due to the sampling time of the Teletype mixer and the time delay of the relays in the mixer which is normally around 22 milliseconds. Tubes 83b, 86a and 86b are used to produce a corresponding delay of the transmitter distributer signal so that the first baud of the transmitter distributer signal may be combined with the first baud of the transmit line signal, the second with the second, etc., as shown in waveforms 226 and 233. This delay can be varied between 0 and 22 milliseconds, depending upon conditions, by adjusting the position of the first oscillator pulse with R-9. The plate of 86b supplies the delayed transmitter distributer signal for the monitor unit as shown in waveform 233. The plate of this tube is high for a space baud and low for a mark baud. The transmitter distributer signal from the plate of 85b as shown in waveform 229 is mixed with a differentiated oscillator shaper pulse from the plate of tube 84b of Fig. 7 on the grid of tube 83b as shown in waveform 230. When the plate of 85b is low the downgoing back edge of the oscillator shaper pulse turns 83b off momentarily thereby producing a positive pulse on the plate of 83b as shown in waveforms 230 and 231. Reference numeral 86 refers to an Eccles-Jordan circuit used to store the transmitter distributer signal baud for the desired delay time. It is reset by the differentiated back edge of each of the five oscillator pulses to a mark condition, as shown in waveforms 232 and 233. When the positive pulse is present on the plate of 83b signifying a space condition on the transmitter distributer signal, circuit 86 is D.C. clamped in its space position until this pulse is gone. Circuit 86 is always reset to its mark position after the last oscillator pulse due to sampling of the transmitter distributer signal during the stop baud as shown in waveforms 228, 229 and 233. If a positive pulse appears on the plate of 83b during the first transmitter distributer signal character baud indicating that the first baud is a space, the Eccles-Jordan circuit is changed to its space condition, and if it is not present, the Eccles-Jordan circuit remains in its mark condition. Therefore, it is seen that no reset for 86 is needed during the first character baud of the transmitter distributer signal and there is none as no oscillator pulse appears during the first baud of the transmitter distributer signal. A neon tube 65 is provided to check the operation of tubes 84, 85, 83b and 86. It is on during a space baud and off during a mark baud on the transmitter distributer signal. It remains off during stop time due to the sampling of the transmitter distributer signal during the stop baud as discussed above.

Figure 9:
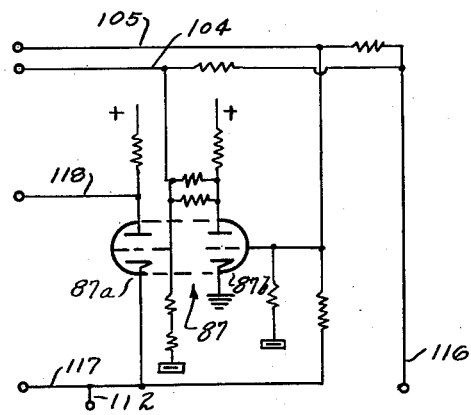
Fig. 9 is a circuit schematic showing the mix circuit of Fig. 2.

Fig. 9 is a mix circuit that compares the transmit line signal from the plate of tube 75b with the delayed transmitter distributer signal from the plate of 86b during the time of the oscillator pulses. Fig. 16 shows the waveforms in the mix circuit. If both plates of 75b and 86b are low or both are high during the oscillator pulses a down-going pulse is produced at the plate of 87a as shown in waveforms 234, 235, 236 and 240. This indicates that the cipher key signal from the baud being sampled is a space. If one of said plates is low and the other high during the oscillator pulse, the plate of 87a remains high. This indicates that the cipher key signal for the baud being sampled is a mark. The transmit line signal from 75b, the delayed transmitter distributor signal from the plate of 86b and the oscillator pulse from the plate of 84b are added on the grid of tube 87b so that when they are all low (see waveform 237) 87b is cut off and an upgoing pulse is produced on the plate of 87b as shown in waveform 238. The transmit line signal, the delayed transmit distributer signal and the signal from the plate of 87b are added on the grid of tube 87a as shown in waveform 239. The oscillator pulse is tied directly to the cathode of 87a so that it is cut off by cathode bias except during the oscillator pulse time. Grid bias keeps tube 87a turned off during the oscillator pulse unless: (1) a pulse is present from the plate of 87b or (2) the plate of 75b and 86b are both high. Under either of these conditions 87a is turned on during the oscillator pulse and a pulse is produced on the plate of 87a as shown in waveform 240. This pulse shall henceforth be called a mix pulse. Condition 1 indicates that the transmit line signal was a space and the transmitter distributer signal was a mark for the baud being sampled and the cipher key was a space. Condition 2 indicates that the transmit line signal was a mark, the transmit distributer signal was a space for the baud being sampled and the cipher key signal was a space. Under either of these conditions, a mix pulse is produced on the plate of 87a. Likewise, if 75b is on and 86b is off or if 75b is off and 86b is on the cipher key signal was a mark for the baud being sampled and no mix pulse is produced at the plate of 87a.

The output of the mix circuit of Fig. 9 is applied to the five baud delay circuit of Fig. 10. This circuit delays the mix pulse output for five oscillator pulses so that the first baud of one cipher key character may be compared with the first baud of the next cipher key character, the second with the second, etc. Fig. 17 shows the waveforms in the five baud delay circuit. The five baud delay circuit consists of five bistable Eccles-Jordan circuits with shaper tubes located between them. The oscillator pulses are applied to all five Eccles-Jordan circuits to return them to their reset position where they remain unless there is a pulse appearing on the preceding shaper tube or from the mix circuit, in the case of delay circuit 88, to retrigger them to their other position. This shows that the previous Eccles-Jordan circuit was reset from its other position by the oscillator pulse which indicates that the succeeding cipher key signal baud is a space. An upgoing edge on the plate of tube 92b indicates that the key baud of the previous cipher key character corresponding in baud number to the one that is being directed to delay circuit 88 from the mix circuit was a space. A downgoing edge or a stable up position indicates it was a mark. The upgoing edge is used to operate reset tube 40b in the absence of a space baud from the mix circuit. If a mix pulse is directed from the mix circuit the reset function is blocked and the counter is not reset. The mix pulse as shown in waveform 242 of Fig. 17 is differentiated and added to the oscillator pulse of waveform 241 on the grid of 88b through resistor R-11 as shown in waveform 243. The leading edge of the oscillator pulse turns 88b off every time. If a mix pulse is present 88b is turned back on by the upgoing back edge of the mix pulse. If no mix pulse is present 88b remains cut off. The plate of 88a has a downgoing edge each time the oscillator pulse turns 88b from an on condition where it was due to the presence of a mix pulse with the preceding oscillator pulse as shown in waveforms 243 and 244. This downgoing edge indicates that a mix pulse was present with the previous oscillator pulse and it has been delayed one oscillator pulse or one baud. Circuit 88, therefore, is the first delay stage of the five baud delay circuit. The downgoing edge off of the plate of 88a is fed into a shaper 93b to generate an upgoing pulse as shown in waveform 245 for the operation of the second delay stage 89. The operation of this stage is the same as stage 88 except that the differentiated shaper pulse is fed onto the grid of 89a because it is of inverted form to that of the mix pulse as shown in waveforms 243 and 246. The signal from the plate of 89a is fed into the shaper 93a for operation of the third delay stage 90 etc., for delay stages 3, 4 and 5. Resistors R-12, R-13, R-14, and R-15 are placed in series with the grids of the shaper tubes to prevent small downgoing edges on the plates of the preceding delay section from cutting off the shaper tube and producing a spike on the shaper tube plate. The condition that produces this small downgoing edge is shown at point 254 in waveform 247 and exists when a space baud follows a mark baud as the cipher key. This condition exists on all delays except the No. 1 stage and is produced by the preceding shaper tube pulse upgoing leading edge which is differentiated on the grid of a delay tube which is already on and therefore is turned on harder during the initial upgoing edge. Resistors R-16, R-17, R-18 and R-19 placed in series with the delay tube grids where the shaper pulses are coupled to them to prevent very small downgoing edges on the shaper plates from operating the delay tube. This condition is shown at point 255 in waveform 245 and is produced by the upgoing edge on the plate of the delay tube feeding into the shaper.

The output of the fifth delay stage 92 indicates whether a mix pulse was present five oscillator pulses earlier. It is taken off of the plate of 92b so that an upgoing edge is present, if a mix pulse were present five oscillator pulses earlier, and a downgoing edge or continuous high condition is present if no mix pulse were present five oscillator pulses earlier as shown in waveform 251. The output of the fifth delay stage is differentiated and added to the mix circuit output through condenser C-11, resistor R-20, condenser C-12 and resistor R-21 on the grid of the reset tube 40b as shown in waveforms 242, 251 and 252. The reset tube is turned on when an upgoing edge appears in the output of the fifth delay stage and there is no mix pulse in the output of the mix circuit. The presence of a mix pulse prevents a reset pulse on the plate of reset tube 40b by biasing the grid of the reset tube down during the mix pulse. Neon tubes 66, 67, 68 and 69 are provided to check the operation of the five baud delay circuit.

In text operation, relay 27 is operated in the manner described in connection with Fig. 1. This operates the relay contact 41 to connect the space-character detector 43 to the grid of reset tube 40 and operates relay contact 42 to apply a negative bias to the grid of tube 86a and thus bias this tube beyond cutoff and lock the transmit distributor circuit in its mark position. This allows the mix circuit to reproduce the transmit line signal and feed it into the five baud delay circuit where each character is stored during the stop time after the character is transmitted. During the stop time each of the Eccles-Jordan circuits has stored in it one of the character bauds of the previously transmitted character. The plates of tubes 88b, 89b, 90b, 91b and 92b are high if the first, second, third, fourth, and fifth bauds were marks, respectively, and they are low if the bauds were spaces, respectively. Any one of the 32 Teletype characters can be detected in the five baud delay during the stop time after the character is transmitted by operating an adder off of the five delay stages. An adder is operated off of the plates of 88b, 89b, 90a, 91b and 92b. When all of these plates are low during the stop time, a space-space-mark-space-space character, or Teletype space character, was the previously transmitted line character. If one or more of them are high something other than a Teletype space character was transmitted. Henceforth, the Teletype space shall be referred to as a space and any one of the 31 Teletype characters shall be referred to as a character. The all low condition of the five delay stages is detected by adding them with the gate waveform, from the plate of tube 76b on the grid of 33b. If they are all low the gate turns 33b off during the stop time. If one or more of the plates are high, 33b is not turned off during the stop time. The signal from the plates of 33b and 76b are added on the grid of 95a of Eccles-Jordan circuit 95 as shown in waveforms 256, 266, and 267 so that 95a is always turned off by the downgoing edge of the gate-stop pulse when there is no upgoing edge on the plate of 33b. Hence, 95a is always turned off at the downgoing edge of the gate-stop pulse. It is turned on at the beginning of a Teletype character by the upgoing edge of the gate-stop pulse only when the downgoing pulse is not present on the plate of 33b. Eccles-Jordan circuit 95 stores the information that something other than a Teletype space-character was transmitted during the preceding line character until the stop time after the next line character. This information is then shown by an upgoing edge on the plate of 95a at the beginning of the next gate stop time. This upgoing edge is coupled to the grid of tube 40a through condenser C-13. If the preceding transmit line character was a space (plate 33b high) this grid is biased to approximately −10 volts. If it were other than a space (plate 33b low) the grid is biased to −45 volts during the stop time as shown in waveforms 266, 274, 282, 269, 277 and 285. In either of the above cases the upgoing edge of 95a turns 40a on and the downgoing edge appears at its plate as shown in waveforms 270, 278 and 286. If the grid is biased to −10 volts which means that the preceding line character was a space, a very sloppy upgoing edge occurs on the plate of 40a as C-13 discharges to −10 volts after the upgoing edge, as shown in waveform 277. If it is biased to −45 volts meaning the preceding line character was a character, a comparatively sharp upgoing edge occurs at the plate of 40a as C-13 discharges to −45 volts after the upgoing edge as shown in waveforms 285 and 286. The plate signals of 33b and 40a are added together and differentiated through C-14 onto the grid of 40b such that if a character-character or a space-space sequence are transmitted reset is accomplished. If a character-space sequence is transmitted, the counter is not reset and is allowed to count up to the eighth position and operate the alarm. This can be seen by referring to the waveforms of Fig. 18 for the time $T_2$. If a character-space sequence is transmitted, the upgoing edge at the plate of 33b is cancelled by the downgoing edge at the plate of 40a and reset tube 40b is not turned on. The sloped upgoing edge on the plate of 40a is not passed through condenser C-14 and therefore will not turn on reset tube 40b. Operation under these conditions is shown in waveforms 266, 270 and 272. A downgoing edge from the plate of tube 33b has no effect on the reset circuit. If a space-space sequence is transmitted, there is no downgoing pulse on the plate of 40a after the second space in succession is transmitted and the upgoing edge from the plate of 33b turns the reset tube on. Operation under these conditions is shown in waveforms 274, 278 and 280. If a character-character sequence is transmitted, the plate of 33b is low during stop time and the grid of 40a is biased to −45 volts. The sharp upgoing edge on the plate of 40a is passed through the differentiator C-14 and turns the reset tube on. Operation under these conditions is shown in waveforms 281, 286 and 288. There is no upgoing pulse on either 33b or 40a for a space-character sequence to turn reset tube 40b on.

There is thus provided a monitor for a teletypewriter to prevent the inadvertent clear text transmission of classified messages and to check for no key or mono-alphabetic key on the transmit line during cipher operation.

Though one specific embodiment has been described in detail, it is to be understood that numerous changes may be made without departing from the general principles and scope of the invention.

We claim:

1. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising means for comparing the transmitter distributer signal of the teletypewriter with the transmit line signal during cipher operation to recover the cipher key signal, an indicating means, means for checking said key signal and for operating said indicating means when said key signal remains unchanged for seven consecutive characters, means for checking the character space sequence during text operation and for operating said indicating means when four consecutive character space sequences have been transmitted and means for switching the monitor between cipher and text operation as the teletypewriter is switched.

2. The device as claimed in claim 1 wherein said indicating means is an audible alarm.

3. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising means for comparing the transmitter distributer signal of said teletypewriter with the transmit line signal to recover the cipher key signal, means for counting the characters applied to the monitor unit, means for indicating when said counting means reaches its eighth counting position, means for resetting said counting means when the cipher key signal changes during cipher operation of the teletypewriter, a second means for operating said resetting means when a character-character sequence or a space-space squence occurs during text operation of the teletypewriter and means responsive to the teletypewriter operation for switching the monitor to text or cipher operation as the teletypewriter is switched.

4. The device as claimed in claim 3 wherein said indicating means is an audible alarm.

5. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a gate circuit, means to apply the transmit line signal of the teletypewriter to said gate circuit to operate said gate upon each transition from a stop baud to a start baud on said transmit line, a counter, means to apply the output of said gate circuit to said counter to operate said counter upon each operation of said gate circuit, means for sounding an alarm and for stopping transmission when said counter reaches its eighth counting position, means for comparing the transmitter distributer signal of said teletypewriter with said transmit line signal to recover the cipher key signal during cipher operation, means responsive to the output of said comparing means for resetting said counter upon a change in said cipher key signal, a second means for operating said resetting means when a character-character sequence or a space-space sequence occurs during text operation of the teletypewriter switching means for switching the monitor to text or cipher operation as the teletypewriter is switched.

6. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a gate circuit, means to apply the transmit line signal of the teletypewriter to said gate circuit to operate said gate upon each transition from a stop baud to a start baud on the transmit line, a counter, means to apply the output of said gate circuit to said counter to step said counter upon each operation of said gate circuit, means connected to said counter for sounding an alarm and for stopping transmission when said counter reaches its eighth counting position, means for resetting said counter upon a change in the cipher key signal of the teletypewriter during cipher operation and upon a character-character sequence or a space-space sequence during text operation, said resetting means having during cipher operation a means for comparing the transmit line signal with the transmitter distributor signal to recover the cipher key signal and means for comparing each cipher key signal with the previous cipher key signal and during text operation means for determining the character space sequence, means for switching the monitor between cipher and text operation as the teletypewriter is switched.

7. The device as claimed in claim 6 wherein the means for comparing each cipher key signal with the previous cipher key signal is a five baud delay circuit wherein the output of the fifth delay stage is compared with the input signal to the first delay stage.

8. The device as claimed in claim 7 wherein a shaper circuit is located between each two delay stages.

9. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a gate circuit, means for applying the transmit line signal of the teletypewriter to said gate circuit to operate said gate upon each transition from a stop baud to a start baud on the transmit line, a counter, means to apply the output of said gate circuit to said counter to step said counter upon each operation of said gate circuit, means connected to said counter for sounding an alarm and for stopping transmission when said counter reaches its eighth counting position, transmitter distributer input circuit, means for comparing the output of said transmitter distributer input circuit with the transmit line signal to recover the cipher key signal, a delay circuit connected between said transmit distributer input circuit and said comparing means, an oscillator, means to apply the output of said gate circuit to said oscillator to release said oscillator for operation for the duration of the gate signal, means for applying the output of said oscillator to said comparing means to permit comparisons to be made only during the interval of the oscillator pulses, means responsive to the output of said comparing means for resetting said counter upon a change in said cipher key signal, second means for resetting said counter when a character-character sequence or space-space sequence occurs during text operation of the teletypewriter and means responsive to the teletypewriter switching means for switching the monitor to text or cipher operation as the teletypewriter is switched.

10. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a transmit line input circuit, means for applying the transmit line signal of the teletypewriter to said transmit line input circuit, a transmit distributer input circuit, means for applying the transmitter distributer signal of said teletypewriter to said transmit distributer input circuit, means for delaying said transmitter distributer signal to properly align it with said transmit line signal, means for comparing the transmit line signal with the delayed transmitter distributer signal to recover the cipher key signal, a gate circuit, means for applying the transmit line signal to said gate circuit to operate said gate upon each transition from a stop baud to a start baud on said transmit line, a counter, means to apply the output of said gate circuit to said counter to operate said counter upon each operation of said gate circuit, means for indicating when said counter reaches its eighth counting position, an oscillator, means to apply the output of said gate circuit to said oscillator to release said oscillator for operation for the duration of the gate signal, means for applying the output of said oscillator to said comparing means to permit comparisons to be made only during the interval of the oscillator pulses, means responsive to the output of said comparing means for resetting said counter upon a change in the cipher key signal, a second means for resetting said counter when a character-character sequence or a space-space sequence occurs during text operation of the teletypewriter and means responsive to the teletypewriter switching means for switching the monitor to text or cipher operation as the teletypewriter is switched.

11. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a transmit line input circuit, means for applying the transmit line signal of the teletypewriter to said transmit line input circuit, a transmit distributer input circuit, means for applying the transmitter distributer signal of said teletypewriter to said transmit distributer input circuit, means for delaying said transmitter distributer signal to properly align it with said transmit line signal, means for comparing the transmit line signal with the delayed transmitter distributer signal to recover the cipher key signal, a gate circuit, means for applying the transmit line signal to said gate circuit to operate said gate upon each transition from a stop baud to a start baud on said transmit line, a counter, means to apply the output of said gate circuit to said counter to operate said counter upon each operation of said gate circuit, means for sounding an alarm and for stopping transmission when said counter reaches its eighth counting position, an oscillator, means to apply the output of said gate circuit to said oscillator to release said oscillator for operation for the duration of the gate signal, means for applying the output of said oscillator to said comparing means to permit comparisons to be made only during the interval of the oscillator pulses, a five baud delay circuit and means for applying the output of said comparing means to said delay circuit, a reset circuit for said counter, means for comparing the output of the fifth stage of said delay circuit with the output of said comparing means to check for a change in cipher key signal to obtain a reset signal, means for applying said reset signal to said reset circuit whereby said counter is reset upon a change in the cipher key signal, a second circuit for determining the character space sequence during text operation of the teletypewriter and for resetting said counter when a character-character sequence or a space-space sequence occurs, means responsive to the teletypewriter switching means for switching the monitor to text or cipher operation as the teletypewriter is switched.

12. A device as claimed in claim 11 wherein high frequency filters are placed in the input circuits of the transmit line input circuit and the transmitter distributer input circuit to keep spurious noise pulses from entering the monitor unit.

13. The device as claimed in claim 11 wherein each of said baud delay circuits consists of a bistable multivibrator, and wherein there is a shaper circuit between each two multivibrators.

14. The device as claimed in claim 13 wherein said oscillator pulses are applied to each of said multivibrators to return them to their reset position where they remain unless a mark pulse is present in the preceding shaper circuit.

15. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a gate circuit, means for applying the transmit line signal of the teletypewriter to said gate circuit to operate said gate upon each transition from a stop baud to a start baud, a counter, means to apply the output of said gate circuit to said counter to step said counter upon each operation of said gate circuit, means connected to said counter for indicating when said counter reaches its eighth counting position, a first sensing circuit for determining when the cipher key signal has remained unchanged on said transmit line for seven consecutive characters during cipher operation of the teletypewriter, said circuit including means for comparing the transmitter distributer signal of the teletypewriter with said transmit line signal to recover the cipher key signal, means responsive to said comparing means for resetting said counter upon each change in the cipher key signal, a second sensing circuit for determining the character space sequence on said transmit line during text operation of the teletypewriter, said circuit including means for comparing each character with the previously sent character, means for applying the output of said last named means to said resetting circuit, whereby said counter is reset when a character-character sequence or space-space sequence occurs, and means for switching the monitor between text and cipher operations as the teletypewriter is switched.

16. A device for monitoring the output of a teletypewriter wherein there is provided a transmitter distributor signal which may be either applied directly to the transmit line or may be mixed with a cipher key signal in a Teletype mixer before it is applied to the transmit line to provide a transmit line signal comprising a gate circuit, means for applying the transmit line signal of the teletypewriter to said gate circuit to operate said gate upon each transition from a stop baud to a start baud, a counter, means to apply the output of said gate circuit to said counter to step said counter upon each operation of said gate circuit, means connected to said counter for sounding an alarm and for stopping transmission when said counter reaches its eighth counting position, a first sensing circuit for determining when the cipher key signal has remained unchanged on said transmit line for seven consecutive characters during cipher operation of the teletypewriter, said circuit including means for comparing the transmitter distributer signal of the teletypewriter with said transmit line signal to recover the cipher key signal, means responsive to said comparing means for resetting said counter upon each change in the cipher key signal, a second sensing circuit for determining the character space sequence on said transmit line during text operation of the teletypewriter, said circuit including means for comparing each character with the previously sent character, means for applying the output of said last named means to said resetting circuit whereby said counter is reset when a character-character sequence or space-space sequence occurs, and means for switching the monitor between text and cipher operations as the teletypewriter is switched.

No references cited.